United States Patent [19]

Robinson et al.

[11] 4,394,499
[45] Jul. 19, 1983

[54] POLYIMIDE RESINS

[75] Inventors: Joseph G. Robinson, Winchcombe; David I. Barnes, Cheltenham, both of England

[73] Assignee: Coal Industry (Patents) Limited, London, England

[21] Appl. No.: 290,089

[22] Filed: Aug. 4, 1981

[30] Foreign Application Priority Data

Aug. 22, 1980 [GB] United Kingdom ................. 8027411

[51] Int. Cl.³ ............................................. C08G 73/10
[52] U.S. Cl. ................................. 528/229; 428/473.5; 525/472; 528/220; 528/233; 528/247; 528/353
[58] Field of Search ...................... 428/473.5; 528/220, 528/233, 247, 353, 229; 525/472

[56] References Cited

U.S. PATENT DOCUMENTS 3,078,279  2/1963  McCraken et al. ............. 260/346.4
4,173,573  11/1979  Schulz et al. ................... 260/346.4

FOREIGN PATENT DOCUMENTS 633923  12/1949  United Kingdom .

Primary Examiner—Lester L. Lee
Attorney, Agent, or Firm—Stevens, Davis, Miller & Mosher

[57] ABSTRACT

This invention relates to an improved polyimide resin and to a method of its production.

The improved polyimide resin is made from phenanthrene which is converted via a 9, 10-diol to oligomers of diphenic anhydride units linked by keto bridges. The oligomers are reacted with from 0.1 to 0.6 of an equivalent quantity of an aromatic primary diamine. The remaining anhydride groups are reacted with a monofunctional amine to give a polyimide of low cross-link density.

The resin will find use for instance in forming glasscloth laminates.

10 Claims, No Drawings

POLYIMIDE RESINS

This invention relates to the preparation of polyimide resin derived from phenanthrene.

In our co-pending Application Nos. 174,153, 240,007 and 240,025 we described methods of preparing polyimide resins from phenanthrene. The general chemistry of the process is illustrated in Application No. 174,152. The basic inventive concept relating to the above application involves the following steps. Phenanthrene or a phenanthrene derivative is reacted with formaldehyde to produce oligomers containing from two to about six phenanthrene moieties linked by methylene bridges. On average there are three phenanthrene moieties in each oligomer. Preferably, the 9- and 10-positions on the phenanthrene are substituted so that the methylene bridges are formed substantially only between the 2- and 3-positions on the phenanthrene nuclei.

The oligomers are oxidised to break the 9, 10 bond in the phenanthrene moieties, converting the oligomers to diphenic acid units linked by keto bridges (I) wherein n is from 2-6.

The oxidised product (I) is then dehydrated so that the diphenic acid moieties are converted into the corresponding diphenic anhydrides, thus forming oligomers of diphenic anhydride linked by keto bridges (II) wherein n is from 2-6.

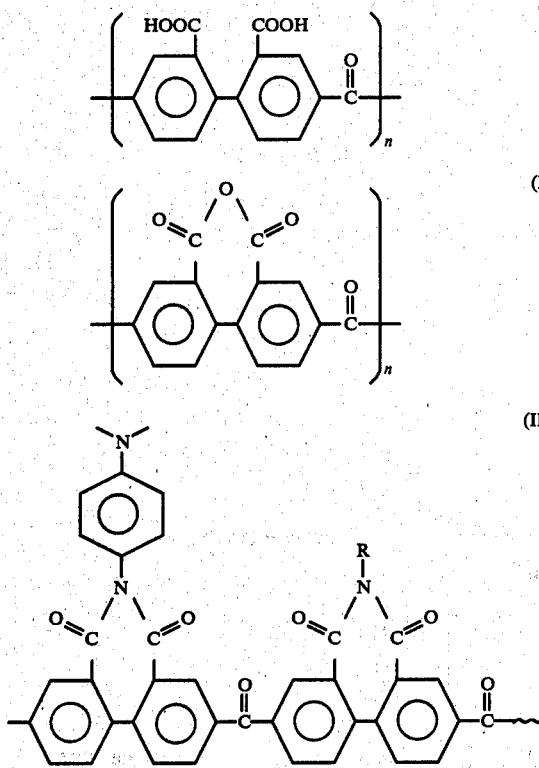

This product is hereinafter referred to as an anhydride derivative, and this term covers any equivalent product made from phenanthrene, whether or not the route used in its production is one of those described in our previous applications.

The anhydride derivative (II) is reacted with a small stoichiometric excess of an aromatic diamine, which ensures that each anhydride group is converted into an imide, thus forming the polyimide resin. This stoichiometric amount of diamine is hereafter referred to as an equivalent quantity of diamine. Since the diamine is difunctional and the anhydride derivative is polyfunctional, reaction of the two results in a highly cross-linked product. Commercially available polyimide resins are thermoplastic, since they are not significantly cross-linked, and therefore differ from resins according to our previous applications referred to above.

The phenanthrene-based polyimide resins produced according to our previous applications have a high degree of thermal stability, the preferred method of preparing these resins being that disclosed in Application No. 240,007.

During further investigation of the properties of these phenanthrene-based polyimide resins it has been surprisingly discovered that the thermal stability of the resin is not increased as the cross-link density of the resin is increased.

Therefore, according to a first aspect of the present invention there is provided an improved phenanthrene-based polyimide resin comprising the reaction product of an anhydride derivative (as hereinbefore defined) and from 0.1 to 0.6 of an equivalent quantity of an aromatic primary diamine, the remaining anhydride groups having been reacted with a monofunctional amine or ammonia.

According to a second aspect of the present invention there is provided a method of producing the improved phenanthrene-based polyimide resin comprising reacting an anhydride derivative (as hereinbefore defined) with from 0.1 to 0.6 of an equivalent quantity of an aromatic primary diamine and reacting the remaining anhydride groups with a monofunctional amine or ammonia.

Preferably the anhydride derivative is produced according to the method disclosed in Application No. 240,007, wherein the phenanthrene is first converted to its 9, 10-diol before being reacted with formaldehyde.

The aromatic diamine may be 1, 4-diaminobenzene or di-(4, 4' aminophenyl) methane. The monofunctional amine may be ammonia or an aromatic amine, and is preferably aniline.

Preferably about 0.25 to 0.33 of an equivalent quantity of aromatic diamine is used.

The polyimide resin according to the invention has a low density of cross-linking and comprises mainly chains of keto-bridged diphenyl units cross-linked together via imide linkages formed with the aromatic diamine (III), wherein the group R is hydrogen or an alkyl or aryl group.

The improved polyimide resins also have advantageous physical properties compared to the highly cross-linked resins described in our previous applications in that they are less brittle and are therefore more suitable for making thermally stable artefacts. The improved polyimide resins according to the present invention will find use in applications such as piston rings, bearings, seals and in glasscloth laminates.

The invention will be described by way of example only, and the improved resin according to the invention will be compared with previously prepared polyimide resins.

PREPARATION OF THE RESIN

Phenanthrene (17.8 g), potassium dichromate (35 g in 50 g of water) and 98% sulphuric acid (100 g) were heated together at 60° C. for 4 hours, whereupon an excess of water was added to the mixture to cause the precipitation of crude 9, 10-phenanthraquinone. The quinone was purified as its bisulphite addition compound from which the pure product, having a melting point of 209°–211° C., was liberated on acidification with dilute hydrochloric acid.

The quinone (5.2 g) was suspended in a mixture of glacial acetic acid (400 g) and distilled water (50 g) and heated at 60° C. for 30 minutes. Sulphur dioxide was then bubbled into the suspension to convert the quinone to phenanthrene -9, 10-diol by mild reduction. After 30 minutes the gas flow was stopped and residual sulphur dioxide was flushed out of the solution with oxygen-free nitrogen. The solution of the diol derivative was kept under nitrogen in order to prevent any reoxidation of it by atmospheric oxygen.

98% sulphuric acid (100 g) was added incrementally to the diol derivative solution over a period of 1 hour. Thereafter formalin (19.7 g) was added and the mixture was held at 60° C. for 3½ hours. At the end of the time an orange-brown reaction product precipitated from solution. The reaction mixture was diluted with an excess (1500 g) of water and the reaction product was filtered off.

The reaction product was analysed by gel permeation chromatography which demonstrated that 67% of it has a molecular weight from 1000 to 1500 and contained about 2% free phenanthrene -9, 10-diol. The impurity was removed by washing with boiling water under a nitrogen atmosphere.

The phenanthrene -9, 10-diol-formaldehyde reaction product (10 g) was dissoved in 1,2 dichloroethane (400 ml), the temperature of the solution was raised to 80° C. and 40% peracetic acid in glacial acetic acid (350 g) was added over a period of 2 hours. The temperature was adjusted to maintain a slight reflux throughout the reaction period. The reaction product was oxidised to produce a polycarboxylated product which was isolated by adding the reaction mixture to water (2000 ml). The organic phase was separated out, filtered and the 1,2 dichloroethane distilled off the yield the crude polycarboxylated product. This was purified by dissolving it in 20% sodium carbonate solution and reprecipitating by the addition of an excess of 0.1 M hydrochloric acid. This was washed free of hydrochloric acid and dried in a vacuum desiccator. The polycarboxylated product was shown by means of proton N.M.R. spectroscopy, mass spectrometry and infra-red spectroscopy data to contain diphenic acid moieties linked by keto groups, the latter being derived from the methylene bridges formed by the formaldehyde.

The polycarboxylated product (10 g) was converted to an anhydride derivative by heating it with an excess (100 g) of acetic anhydride. The solution was cooled, diluted with water and filtered to recover the anhydride derivate, which was dried in a vacuum desiccator.

The anhydride derivative (10 g) was dissolved in dry dimethyl sulphoxide (DMSO) and added to a solution of 0.75 of an equivalent quantity (14.0 g) of aniline in DMSO. The mixture was heated with stirring at 35° C. for 12 hours causing the formation of acid amides (IV) wherein n is from 2-6. The solution was cooled, mixed with a solution of an excess of 1,4 diaminobenzene in DMSO and reheated to 180° C. for 1 hour. The remaining anhydride groups were thus reacted with the diamine to form acid amides. The solution was spread as a thin layer in a shallow glass vessel. The DMSO and excess diamine were removed by distillation under reduced pressure, leaving a film of the acid amide derivative. The film was heated at 300° C. for 3 hours to cause the acid amides to form imides (V), wherein the group X is hydrogen or a nitrogen atom connected into an imide linkage and n is from 2-6.

Similar polyimide resins were made using 0.33 and 0.1 of an equivalent quantity of aniline. These and a commercially available polyimide resin "Kapton" were then tested for thermal stability by thermogravimetric analysis. In these tests the sample was heated on a thermobalance at a rate of 30° C./min in a nitrogen atmosphere. The temperature at which each sample's weight had been reduced by 10% was recorded. This temperature was used as an index of the thermal stability of the product, the higher the temperature the greater the thermal stability. The results obtained are shown below.

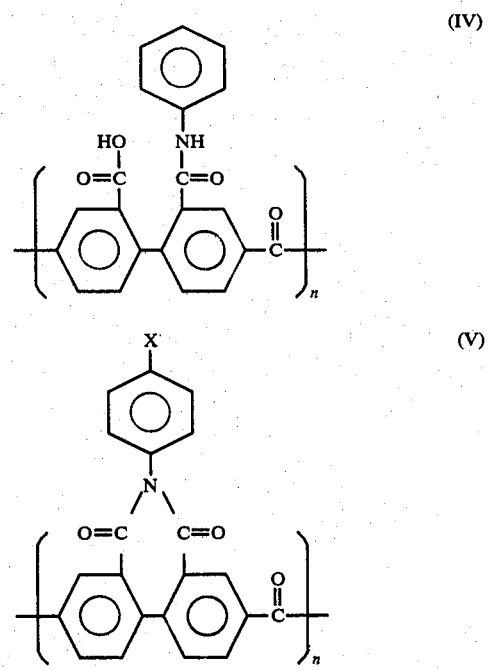

| Resin | Temperature at 10% weight loss |
|---|---|
| Commercial Resin "Kapton" | 610° C. |
| Phenanthrene-based Polyimide Resins: | |
| 0.75 equivalents of aniline | 625° C. |
| 0.33 equivalents of aniline | 550° C. |
| 0.01 equivalents of aniline | 500° C. |

It can be seen from these results that the phenanthrene-based polyimide resin according to the present invention and thus having a low cross-link density is, surprisingly, more thermally stable than any of the other resins.

We claim:
1. An improved phenanthrene based polyimide resin comprising a reaction product of (1) diphenic anhydride oligomers comprising two to about six moieties of

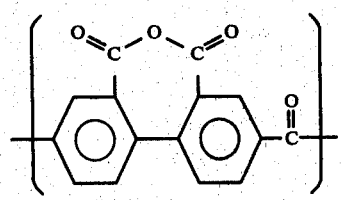

and (2) from 0.1 to 0.6 of an equivalent quantity of an aromatic primary diamine and from 0.9 to 0.4 of an equivalent quantity of a monofunctional primary amine or ammonia.

2. A resin according to claim 1, in which the anhydride oligomer is the product of dehydrating diphenic acid oligomers comprising two to about six moieties of

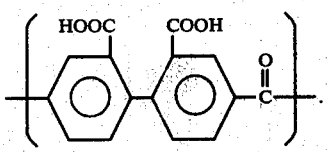

3. A resin according to claim 1, in which the aromatic diamine is 1,4 diaminobenzene or di-(4-aminophenyl) methane.

4. A resin according to claim 1, in which the monofunctional amine is aniline.

5. A resin according to claim 1, in which the resin comprises from about 0.25 to 0.33 of an equivalent quantity of aromatic diamine.

6. A method of producing an improved phenanthrene-based polyimide resin comprising reacting diphenic anhydride oligomers comprising two to about six moieties of

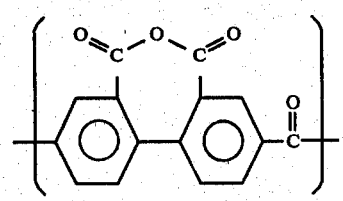

with from 0.1 to 0.6 of an equivalent quantity of an aromatic primary diamine and from 0.9 to 0.4 of an equivalent quantity of a monofunctional primary amine or ammonia.

7. A method according to claim 6, including the step of dehydrating diphenic acid oligomers comprising two to about six moieties of

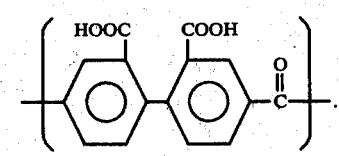

8. A method according to claim 6, in which the aromatic diamine is 1,4 diaminobenzene or di-(4-aminophenyl) methane.

9. A method according to claim 6, in which the monofunctional amine is aniline.

10. A method according to claim 6, in which from 0.25 to 0.33 of an equivalent quantity of aromatic diamine is used.

* * * * *